United States Patent Office 3,411,964
Patented Nov. 19, 1968

3,411,964
ILLUMINATING FLARE COMPOSITION COMPOSED OF MAGNESIUM, SODIUM NITRATE, AND A VINYL TERMINATED POLYSILOXANE BINDER
Bernard E. Douda, Bloomfield, Ind., assignor to the United States of America as represented by the Secretary of the Navy
No Drawing. Filed July 31, 1967, Ser. No. 657,727
1 Claim. (Cl. 149—19)

ABSTRACT OF THE DISCLOSURE

An illuminating flare composition comprised of a fuel, such as magnesium, an oxidizing agent, such as sodium nitrate, and a silicone resin binder which is a complex mixture of organo-polysiloxanes having the organic groups of methyl, phenyl, and vinyl radicals attached to the silicon atoms.

---

The invention described herein may be manufactured and used by or for the Government of the United States of America for governmental purposes without the payment of any royalties thereon or therefor.

BACKGROUND OF THE INVENTION

The present invention relates to a consumable pyrotechnic device, that is, an illuminating flare, and particularly to a flare which is to have military application, such as one to be dropped from an aircraft by parachute.

Various binders are known in the art for use in illuminating flares with the binders serving as a cohering agent for the oxidizing and light or color producing ingredients. For example, U.S. Patent 2,841,481, which issued July 1, 1958, to Ronald G. Hall, discloses pyrotechnic compositions utilizing phenol-formaldehyde resin, a urea-formaldehyde resin, or a melamine-formaldehyde resin as a binding agent.

In U.S. Patent 2,984,558, which issued May 16, 1961, to Edward Rolle, there is disclosed a binder which is a mixture of two unsaturated polyester resins having styrene as a reactive monomer. Presently, many flare compositions which are used by the military have a polyester resin for a binder, however these resins have some disadvantages, particularly during processing. For example, many polyester resins have a very short pot life and also are very tacky which makes it difficult to clean the mixing equipment.

SUMMARY OF THE INVENTION

The present invention relates to an illuminating flare which is comprised of magnesium, sodium nitrate and a silicone resin binder which is a complex mixture of organo-polysiloxanes having the organic groups of methyl, phenyl, and vinyl radicals attached to the silicon atoms.

One particular advantage of using a silicone resin as a binder for flares is that there is no exotherm during polymerization. This feature reduces the possibility of accidental ignition. Another safety advantage is provided in that the silicone resin is all solids, and since there is very little vapor pressure there is almost no odor. Consequently, the possibility of becoming obnoxious in the mixing or working area is greatly reduced. This characteristic is contrasted to the condition where polyester resins containing styrene are used. The styrene solvent evaporates during the mixing and handling process and not only is it odorous, but the vapors can become an explosion hazard. Still another safety feature associated with silicone resins is the ability to clean the mixing equipment with isopropyl alcohol which is reasonably non-toxic. The polyester resins, on the other hand, are generally cleaned from the mixing equipment by using acetone.

The silicone resin binder used in the illuminating flares disclosed herein is compatible with magnesium and sodium nitrate and after polymerization the resin is durable and tough. After polymerization, the flares are relatively insensitive to drop, friction, and electrostatic energy.

It is therefore a general object of the present invention to provide an improved illuminating flare composition which is relatively safe to mix and handle.

Other objects and advantages of the present invention will be readily appreciated as the same becomes better understood by reference to the following detailed description.

DESCRIPTION OF THE PREFERRED EMBODIMENT

The illuminating flares of the present invention are comprised essentially of a mixture of between 54 and 62 percent magnesium, between 28 and 38 percent sodium nitrate, and between 3 and 15 percent of a silicone resin which is a complex mixture of organo-polysiloxanes having the organic groups of methyl, phenyl, and vinyl radicals attached to the silicon atoms.

The following are examples of compositions according to the present invention.

Example 1

| | Percent |
|---|---|
| Magnesium (granulation 18) | 62 |
| Sodium nitrate (20 microns) | 35 |
| Silicone resin (Sylgard 182) | 2.7 |
| Curing agent (182 catalyst) | 0.3 |

The magnesium particles were of granulation 18, as defined in Mil-Spec JAN–M–382, entitled, "Magnesium Powder for Use in Ammunition." The silicone resin and catalyst were obtained from the Dow Corning Corporation, Midland, Mich., under the trade name Sylgard 182, and 182 curing agent, which is a metal catalyst. The following is a chemical analysis of the silicone resin:

| | Percent |
|---|---|
| Silicon | 37.7 |
| Oxygen | 21.5 |
| Carbon | 32.7 |
| Hydrogen | 8.1 |

The silicone resin and catalyst were first preblended and then mixed with the magnesium. This mixture was then blended and finally the sodium nitrate was added, and then the mixture was blended until a homogeneous mix was obtained. The mixture was then put into a container and pressed at 8450 p.s.i. to form a candle 4.25 inches in diameter. The weight of the candle was 6800 g. The candle was burned with the following results:

| | |
|---|---|
| Burning time, secs. | 205 |
| Burning rate, g./sec. | 33.1 |
| Candlepower | $1.16 \times 10^6$ |

Example 2

| | Percent |
|---|---|
| Magnesium (granulation 18) | 58 |
| Sodium nitrate (20 microns) | 37.5 |
| Silicone resin (Sylgard 182) | 4.05 |
| Curing agent (182 catalyst) | 0.45 |

The ingredients were mixed as in Example 1 and pressed at 8450 p.s.i. to form a candle 4.25 inches in diameter. The weight of the candle was 6800 g. The candle was burned with the following results:

| | |
|---|---|
| Burning time, secs. | 207 |
| Burning rate, g./sec. | 33.0 |
| Candlepower | $0.90 \times 10^6$ |

Example 3

| | Percent |
|---|---|
| Magnesium (granulation 15) | 58.4 |
| Sodium nitrate (150 microns) | 28.8 |
| Silicone resin (Sylgard 182) | 11.52 |
| Curing agent (182 catalyst) | 1.28 |

The ingredients were mixed as in Example 1 and then poured into a container to cast a candle 16 inches in diameter. The weight of the candle was 56,750 g. The candle was burned with the following results:

| | |
|---|---|
| Burning time, secs. | 81.5 |
| Burning rate, g./sec. | 696.3 |
| Candlepower | $4.21 \times 10^6$ |

Example 4

| | Percent |
|---|---|
| Magnesium (granulation 17) | 57 |
| Sodium nitrate (150 microns) | 29.2 |
| Silicone resin (Sylgard 182) | 12.42 |
| Curing agent (182 catalyst) | 1.38 |

The ingredients were mixed as in Example 1 and then poured into a container to cast a candle 16 inches in diameter. The weight of the candle was 56,750 g. The candle was burned with the following results:

| | |
|---|---|
| Burning time, secs. | 160.8 |
| Burning rate, g./sec. | 352.9 |
| Candlepower | $3.73 \times 10^6$ |

Example 5

| | Percent |
|---|---|
| Magnesium (granulation 15) | 54.4 |
| Sodium nitrate (150 microns) | 31.2 |
| Silicone resin (Sylgard 182) | 12.96 |
| Curing agent (182 catalyst) | 1.44 |

The ingredients were mixed as in Example 1 and then poured into a container to cast a candle 16 inches in diameter. The weight of the candle was 56,750 g. The candle was burned with the following results:

| | |
|---|---|
| Burning time, secs. | 81 |
| Burning rate g./sec. | 700.6 |
| Candlepower | $8.3 \times 10^6$ |

Example 6

| | Percent |
|---|---|
| Magnesium (granulation 17) | 60.0 |
| Sodium nitrate (20 microns) | 25.0 |
| Silicone resin (Sylgard 182) | 13.5 |
| Curing agent (182 catalyst) | 1.5 |

The ingredients were mixed as in Example 1 and then poured into a container to cast a candle 16 inches in diameter. The weight of the candle was 56,750 g. The candle was burned with the following results:

| | |
|---|---|
| Burning time, secs. | 123.3 |
| Burning rate, g./sec. | 460.2 |
| Candlepower | $4.75 \times 10^6$ |

The pot life of Sylgard 182 is about eight hours and polymerization is a function of temperature. At room temperature, the resin will cure in about twenty-four hours, and at a temperature of 65 degrees C., the cure time is about four hours.

Obviously many modifications and variations of the present invention are possible in the light of the above teachings. It is therefore to be understood, that within the scope of the appended claim, the invention may be practiced otherwise than as specifically described.

I claim:
1. An illuminating flare composition composed, by weight, of between 54 and 62 percent of magnesium; between 28 and 38 percent sodium nitrate; between 3 and 15 percent of a vinyl terminated polysiloxane composed of about 37.7 percent silicon, about 32.7 percent carbon, about 21.5 percent oxygen, and about 8.1 percent hydrogen; and between 0.3 and 1.5 percent of a metal catalyst for curing said vinyl terminated polysiloxane.

References Cited
UNITED STATES PATENTS

| | | | |
|---|---|---|---|
| 2,968,542 | 1/1961 | Brock | 149—43 X |
| 3,257,801 | 6/1966 | Martinez et al. | 149—43 X |

CARL D. QUARFORTH, *Primary Examiner.*

S. J. LECHERT, JR. *Assistant Examiner.*